Aug. 23, 1966  H. MASCHMANN ETAL  3,267,892
MULTIPLE AUTOMATIC SEWING APPARATUS
Filed Aug. 5, 1964  10 Sheets-Sheet 1

INVENTORS
HANS MASCHMANN
REINHOLD DOBNER
HEINRICH BUNGERT
ERNST ALBRECHT
BY
ATTORNEY

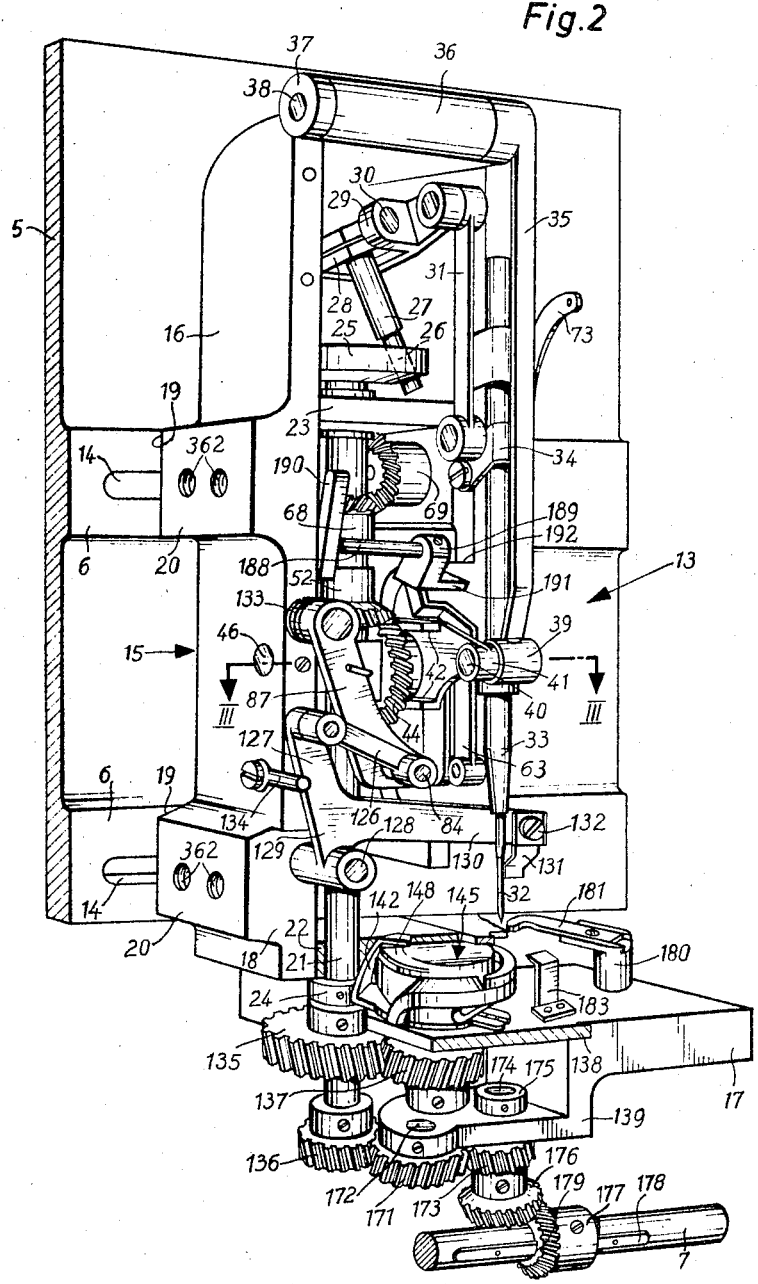

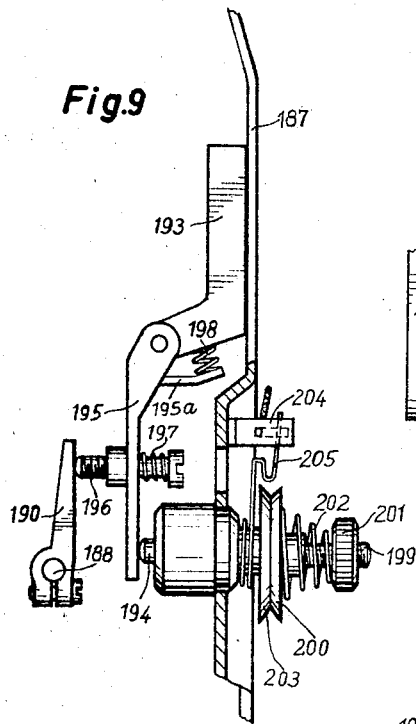
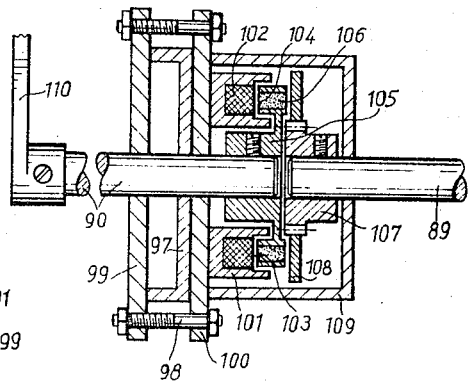
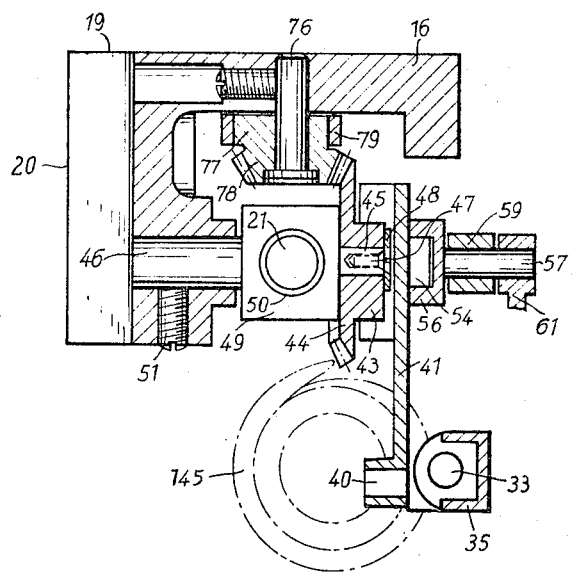

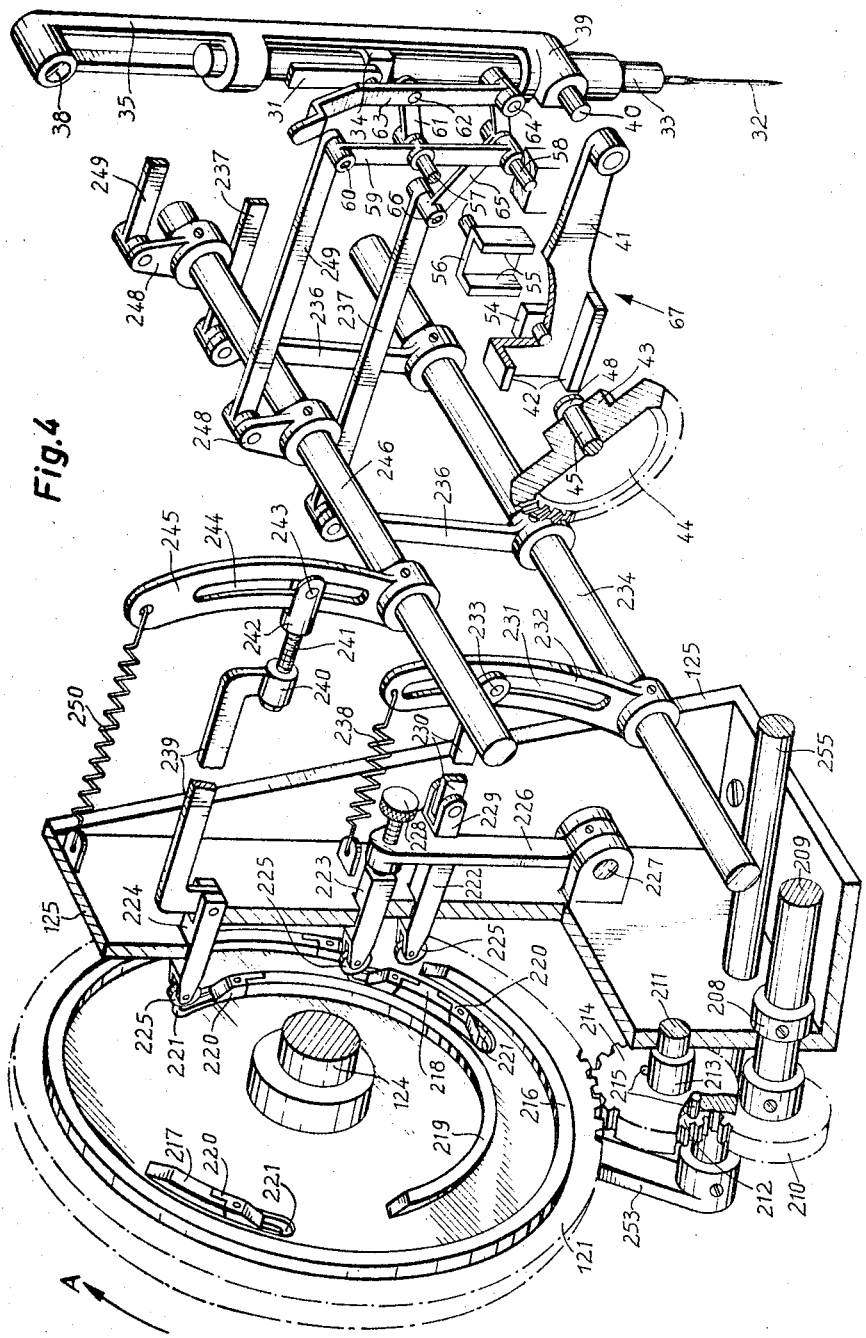

Aug. 23, 1966

H. MASCHMANN ETAL 3,267,892

MULTIPLE AUTOMATIC SEWING APPARATUS

Filed Aug. 5, 1964

INVENTORS
HANS MASCHMANN
REINHOLD DOBNER
HEINRICH BUNGERT
ERNST ALBRECHT
BY

ATTORNEY

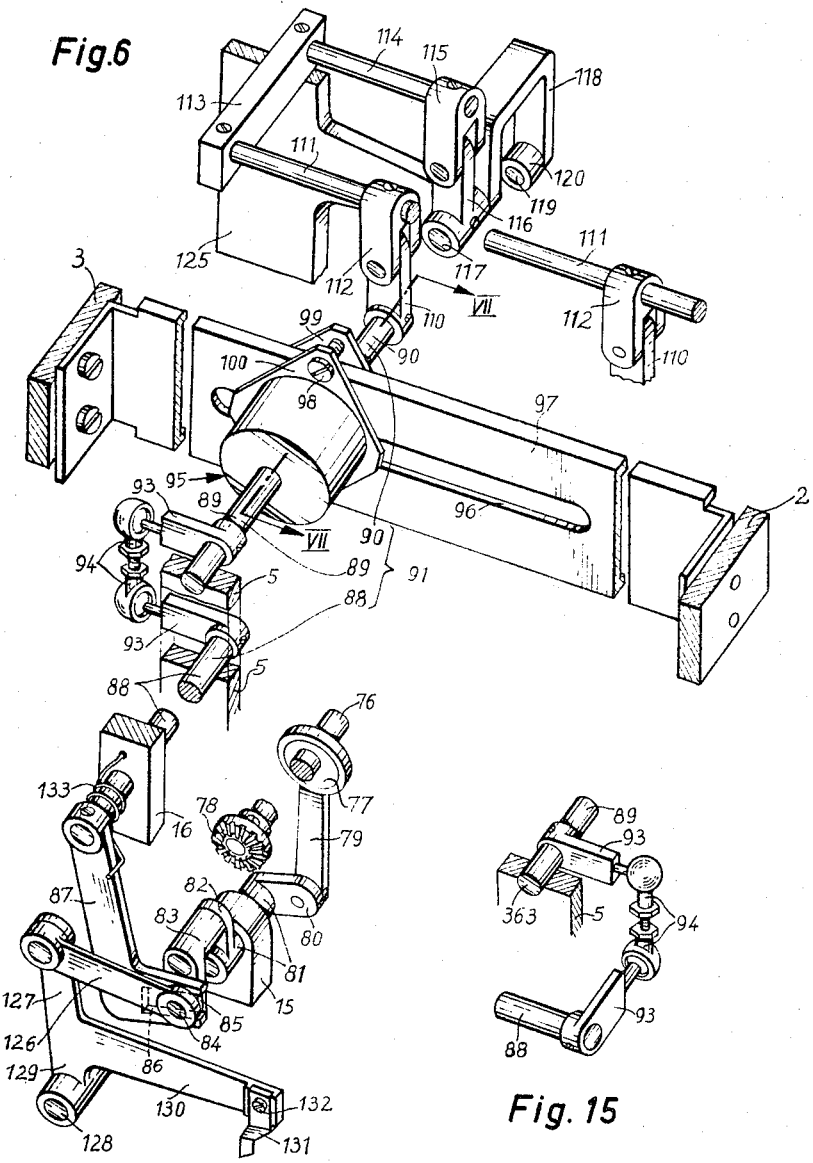

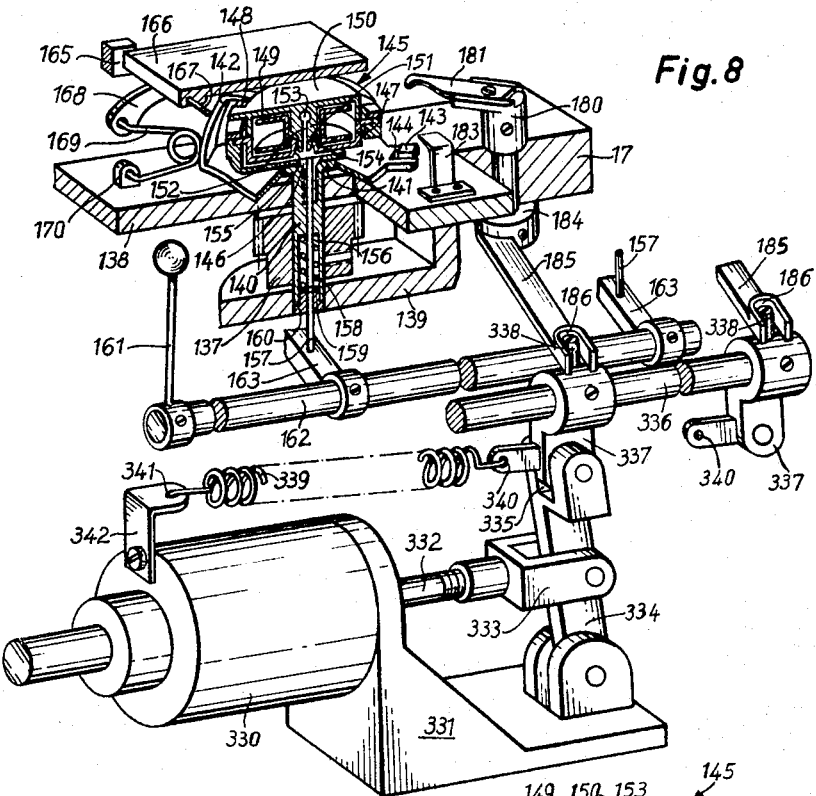

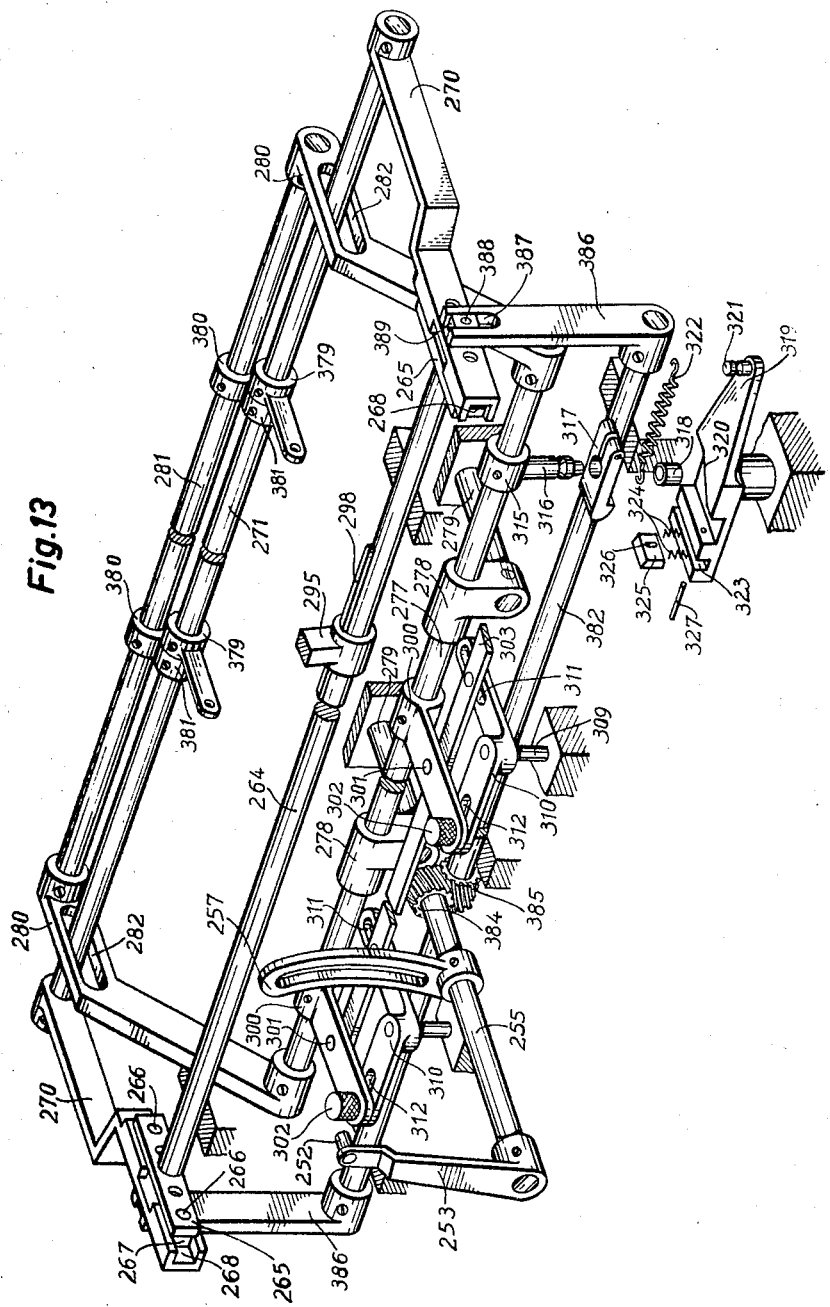

United States Patent Office 3,267,892
Patented August 23, 1966

3,267,892
MULTIPLE AUTOMATIC SEWING APPARATUS
Hans Maschmann, West Orange, N.J., and Reinhold Dobner, Kaiserslautern, Pfalz, Heinrich Bungert, Karlsruhe, and Ernst Albrecht, Hochspeyer, Germany, assignors to G. M. Pfaff AG, Kaiserslautern, Pfalz, Germany, a corporation of Germany
Filed Aug. 5, 1964, Ser. No. 387,605
Claims priority, application Germany, Sept. 21, 1963, P 32,637
12 Claims. (Cl. 112—2)

The present invention relates to multiple automatic sewing appartus or aggregates of the type comprising an array of synchronously driven sewing units cooperating with a corresponding number of work clamps mounted upon a common work displacing frame or support.

There is already known sewing apparatus of this type comprising a plurality of simultaneously driven sewing heads mounted upon a common support above a work supporting surface and a corresponding number of cooperating loop takers and drive mechanisms disposed below said surface. It is also known to utilize a plurality of work clamps mounted upon a common slide frame which is operated by a control cam.

It is not possible by the use of apparatus of the referred to type to produce multiple stitching patterns on the basis of zigzag stitches and closed upon themselves, such for instance as buttonholes. For the latter purpose, it is customary to use a sewing assembly comprised of a number of self-contained automatic sewing machines mounted upon a common support and operated by a common control device.

Aside from the increased expenditure involved in the use of a number of separate sewing machines, it is possible with arrangements of the afore-mentioned type to sew multiple stitching patterns at relatively large spacing distances only as determined by the dimension or width of the individual sewing machines. In order to sew a plurality of closed patterns, such as buttonholes, at relatively closer spacing distances, it has been proposed to mount the machines at a distance equal to twice the desired spacing distance of the stitching patterns and to sew, for instance, a row of six buttonholes in two successive operating steps, that is, to first sew the first third and fifth buttonholes during a first operating step, to displace the work by a corresponding distance along the line of the buttonholes to be sewn, and to then sew the second, fourth and sixth buttonholes of the set during a second operating or sewing cycle. Not only is the total operating time doubled in this manner, but additional means are required for the displacement of the work by a distance equal to a buttonhole spacing distance. Besides, this arrangement is subject to the difficulty of ensuring an accurate and constant distance between the buttonholes being sewn by the use of conventional and economical adjusting or control means.

Accordingly, an important object of the present invention is the provision of multiple automatic zigzag sewing apparatus of the referred to type, especially, though not limitatively, for the sewing of a series or array of spaced zigzag patterns, being closed upon themselves, such as buttonholes, by which the foregoing and related difficulties and drawbacks inherent in the prior art arrangements are substantially eliminated.

A more specific object of the invention is the provision of multiple automatic sewing apparatus of the referred to type which will enable the sewing upon a common work piece of multiple closed patterns, in particular buttonholes, at relatively close and preferable variable spacing distances.

Another object of the invention is the provision of multiple sewing apparatus of the type referred to which will enable the sewing of a row or array of buttonholes either parallel to or at an angle, such as a right angle, to the edge of the workpiece or fabric by simple rotation of the sewing units and work clamps and re-routing of certain linkage elements, substantially without removal or re-orientation of the workpiece.

The invention, both as to the foregoing and ancillary objects as well as novel aspects thereof, will be better understood from the following detailed description, taken in conjunction with the accompanying drawings forming part of this specification and in which:

FIG. 2 is a perspective view of one of the sewing units of FIG. 1, shown with its cover removed for better illustration;

FIG. 3 is a sectional view taken on line III—III of FIG. 2;

FIG. 4 is a schematic perspective representation, as viewed from one side, of the program or control device and control mechanism for varying the overstitch width and sewing position of the multiple sewing units for the sewing of longitudinal buttonholes;

FIG. 6 is a perspective "exploded" view of the mechanism for the operation of the buttonhole cutting knives;

FIG. 7 is a sectional view taken on line VII—VII of FIG. 6;

FIG. 8 is a perspective view of the loop taker of the sewing units shown in section and of the lower thread cutting and bobbin ejecting mechanism;

FIG. 8a is a sectional view more clearly showing the construction of the loop taker of FIG. 8;

FIG. 9 is a side view of the thread tension release mounted upon the coverplate of the sewing units;

FIG. 13 is a perspective view showing the arrangement for the operation of the transposed upper thread cutters;

FIG. 15 illustrates the linkage mechanism between two component parts of the control shaft for the buttonhole cutters with the sewing units in the change-over position for the sewing of transverse buttonholes; and FIG. 16 is a perspective view of the intermediate section of the casing designed to accommodate the work supporting bed or table.

Like reference characters denote like parts and devices throughout the different views of the drawings.

Figure 1:
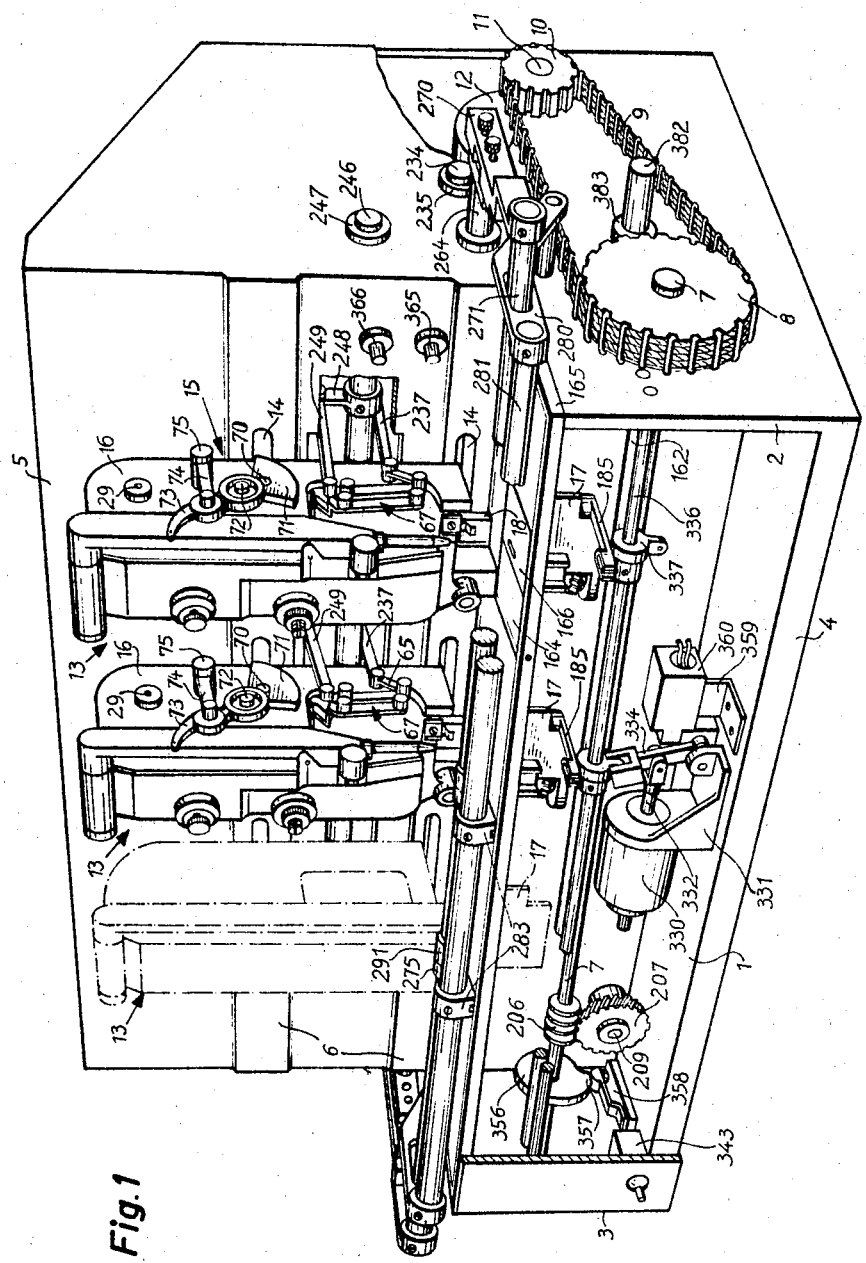
FIG. 1 is a perspective view of a complete multiple automatic sewing apparatus or machine for the simultaneous sewing of an array of longitudinal buttonholes, or buttonholes in line with the edge of a fabric or workpiece, said machine being constructed in accordance with the principles of the invention.

With the foregoing objects in view, the invention involves generally the provision of multiple automatic sewing apparatus of the type referred to, comprising essentially an array of identical sewing units in mutually spaced and juxtaposed relation, each of said units in turn comprising a casing or support for the stitch-forming tools, the drive means therefor and control mechanism for changing the overstitch width and stitching position of the needles. All said units, cooperating with a corresponding number of work clamps mounted upon a common displaceable supporting or sliding frame, are controlled in unison or synchronism with each other and said frame by means of a single program or control device, for the simultaneous sewing of a number of identical and spaced stitching patterns, in particular button holes, as illustrated by the drawings.

Among other advantages, the sewing units in the case of the invention may be arranged at relatively small and preferably adjustable distances, in such a manner as to enable the sewing of relatively closely spaced buttonholes or the like zigzag stitching patterns economically and expeditiously, as required in connection with automatic mass production operations.

In order to enable the sewing, by the aid of apparatus according to the present invention, of stitching patterns, in particular buttonholes, being either parallel to the common supporting surface of the sewing units, or the edge of the fabric, or enclosing an angle with said edge, respectively, the sewing units may be mounted for change-over from one angular position to another angular position in respect to the needle oscillating plane or supporting surface of the units, while maintaining a constant distance between the needle bar axis from said plane, with further means being provided to displace the multiple work clamps upon the common work supporting frame through the same change-over angle. Furthermore, suitable conversion means may be provided for the insertion in the control or linkage mechanisms between the common program or control device and the adjusting devices of the individual sewing units, to adapt the latter for the sewing of the differently oriented patterns.

The displacement of the sewing units and work clamps from one to another angular position relative to the needle oscillating plane makes it possible, for instance, to utilize the multiple sewing apparatus initially designed for the sewing of an array of buttonholes being parallel to the edge of a workpiece (longitudinal buttonholes) for the sewing of buttonholes transverse to said edge (transverse buttonholes), by a relatively simple conversion of the machine and re-routing of certain linkage elements, as will become further apparent as the following description precedes in reference to the drawings.

In order to provide the same space for the positioning and passage of the workpiece in the different angular operating positions of the sewing units, the axis of the needle bar of each sewing unit is advantageously located upon the bisector of a pair of mounting surfaces upon the supports or casings of the units (for the mounting and adjustment of the sewing units in the different angular positions) with said units being comprised of upper and lower parts and an intermediate part or section connecting the former parts and being disposed within the region of the intersection of said surfaces.

Among other advantages, the invention makes it possible to utilize a single program device and the major part of the control and transmission means, to apply the control movements derived from said device to the control mechanisms of the sewing units and work displacing means in the different operating positions of the multiple sewing aggregate, by the aid of a separate control shaft for each of the transmission or linkage means for the control of the overstitch width and stitching position of all the sewing units, respectively, as well as for the displacement of the work supporting means, each of said control shafts being in operative connection with the common program or control device through suitable transmission means adapted for the separate angular operating positions of the sewing units. All that is required, therefore, in order to change from one to another angular operating position of the sewing units, is the interchange or readjustment of certain linkage devices of the units and work clamps, aside from the rotation of the sewing units from one to another operating position.

The usefulness of the multiple sewing machine according to the invention may be greatly extended by the provision of relatively simple means for the adjustment of the mounting position of the sewing units and work clamps, the control shafts and connecting links, in an effort to vary the distance between the stitching patterns, in particular buttonholes, being sewn.

Furthermore, in order to avoid the use of separate auxiliary or operating devices having their own drive and control means, such as buttonhole cutting knives, thread cutters, bobbin ejectors, etc., for each of the separate sewing units, like auxiliary devices of the units may be controlled or operated in unison, such as by means of common control shafts, in a manner similar to the main operating controls (overstitch width, sewing position, etc.).

Moreover, the auxiliary devices for the cutting of the buttonholes are advantageously constructed and operated in such a manner that, in case of thread breakage in the sewing of any one buttonhole, cutting of the respective buttonhole is suppressed, while the remaining buttonhole cutters continue to operate in the ordinary manner. For the latter purpose, each of the buttonhole cutters may be mounted upon a rocking lever operated through a linkage mechanism which serves to set the cutter, by means of a control lever, from an inoperative to an operative position, and vice versa. Said control lever is in turn operated through a magnetic coupling inserted in the control or linkage mechanism of the program device. The magnetic coupling being normally in engaged position, whereby to maintain said rocking lever, and in turn the buttonhole cutter, in the operative position, is disengaged in a known manner by the action of a thread tension monitoring device, in such a manner as to disable the respective buttonhole cutter, as will be further understood from the following detailed description of the invention in reference to the drawings.

Referring more particularly to the drawings, FIG. 1, the multiple sewing machine as shown comprises a frame or main support 1 having a pair of side walls 2 and 3 and a vertical supporting wall or panel 5 disposed between said side walls and at right angle to the base 4 of the machine. Provided upon the front surface of the wall 5 are a pair of spaced projecting or mounting ribs 6 which form a plane supporting surface for the mounting of an array of sewing units as described in further detail in the following. Journalled in the side walls 2, 3 and in front of the wall 5 is a drive shaft 7 being parallel to and spaced from the base 4 and secured against axial displacement by means of set rings (not shown), or in any other suitable manner. Secured to the end of shaft 7 projecting outwardly through the side wall 2 is a gear or sprocket 8 operatively connected with a further gear or sprocket 10 through a chain 9, said further sprocket being in turn secured to the end of a shaft 11 also journalled in the wall 2 and extending from a drive motor 12 mounted upon the frame 1 behind the wall 5. Motor 12 is advantageously a conventional braking motor adapted for operation at two speeds, to continue rotation through a certain angle upon disconnection from the power source and to enable the machine to be stopped at a definite position within its operating or stitching cycle, that is, the "UP" position of the needle in the case of the present invention.

Mounted in juxtaposed relation upon the wall 5 of the frame 1 are multiplicity or an array of sewing units 13 proper, the spacing distance between said units being preferably adjustable by the mounting thereof by means of screws (not shown) secured in longitudinal slots 14 of the mounting ribs or surface 6, or by mounting in any other suitable manner. Inasmuch as all the sewing units 13 (three being shown in the drawings) are identical, only one of the units will be described in detail in the following.

Each sewing unit 13, FIG. 2, comprises a support or casing 15 having an upper part or section 16, a lower part or section 17 and an intermediate part or section 18. The section 15 is fitted with a pair of flat or plane mounting surfaces 19, 20 disposed at an angle, such as a right angle in the example shown, and adapted to engage the supporting surface 6 for the positioning of the units in their respective angular operating positions. The intermediate or connecting part 18 is advantageously disposed within the region of intersection of the surfaces 19, 20, whereby to provide an equal and adequte space for the passage of the workpiece or sewing fabric in the different angular operating positions of the units.

Journalled in a position parallel to the mounting surfaces 19, 20 and within a pair of supporting walls 22 and 23 of the housing section 15 is a vertical operating shaft 21, said shaft being secured against axial displacement by a set ring 24 disposed below the wall 22, on the one hand, and by a disk 25 disposed above the wall 23. Disk 25 is provided with an eccentric bore slanting towards the axis of shaft 21 and being engaged by a pin 27 of a link 28 which is secured, by clamping or in any other manner, to a pin 30 journalled in an oscillating lever 29. Lever 29, being mounted for oscillation upon the section 15, is in turn connected, through a pull rod 31, with a follower 34 of the reciprocating needle bar 33 carrying a needle 32 at its lower end. Needle bar 33 is mounted in axially displaceable fashion in a needle bar oscillating frame or support 35 which is secured to a bearing pin 38 or shaft rotatively mounted within sleeve 36 supported by casing part 15 and being secured against axial displacement by a set ring 37, whereby to enable said frame to oscillate about the pin 38, in a manner well known in connection with zigzag sewing machines.

Provided at the lower end of the needle bar oscillating frame 35 is a bearing or bush 39 in which is secured a bolt 40 projecting at one side. Rotatively mounted upon the projecting end of the bolt 40, FIG. 3, is one end of a control lever 41 fitted with a slot guide 42 at its opposite end which is engaged by an eccentric 43 secured to or forming part of a bevel gear 44 which is rotatively mounted upon the cylindrical extension 45 of a shaft 46 and secured against axial displacement by a disk 48 secured to the edge surface of the extension 45 by means of a screw 47. Shaft 46 has its enlarged central portion provided with a bore 50 having a diameter greater than the diameter of shaft 21 passing therethrough, and is secured to the housing part 15 by means of a screw 51. Bevel gear 44 meshes with a counter gear 52 mounted upon the shaft 21.

Rotatively supported by the pin 53, FIG. 4, secured to the lever 41 is a slide block 54 adapted to cooperate with the guide surfaces 55 of an adjusting guide 56. The latter has a shaft or pin 57 which projects through a bore of an adjusting lever 59 rotatively supported at one end by a bolt 58 being rigid with the casing of the sewing unit. Lever 59 is extended in the upward direction and provided at its opposite end with a bore 60 which serves as a pont of application of control force or movement for the guide 56, to change the position of the latter relative to the oscillating axis (bolt 38) of the needle bar frame 35 for the control of the stitching position, in the manner described in greater detail in the following. Secured to the opposite projecting end of the pin 57 is one end of a link 61 whose remaining end is journalled, by means of a pin 62 in a link 63 extending in the upward direction. The lower end of link 63 is rotatively supported by a pin 64 which is secured to one arm of an angular adjusting lever 57 rotatively mounted upon the bolt 58. The remaining arm of lever 65 has a bore 66 forming a point of application of the control force or movement for the control of the angular or rotational position of the guide 56, to vary the overstitch width in the manner further described in the following. In other words, the afore-described adjusting mechanism being designated collectively by the numeral 67 in the drawing serves to effect the control of the stitching position (lever 59) and overstitch (lever 65) of the zigzag stitches produced by the sewing units 13.

Secured to the shaft 21 above the bevel gear 52 is a further bevel gear 68, FIG. 2, which meshes with a counter bevel gear 69 secured to a shaft 70 rotatively mounted in the casing part 15, FIG. 1. Secured to the end of shaft 70 projecting through the casing 15 is a crank 71 having a crank pin 72. Rotatively mounted upon the latter is a thread take-up lever 73 provided with a thread-passing eye and to which is in turn jointed the end of a link 74 whose opposite end is rotatively mounted upon a bolt 75 secured to the casing part 15.

Meshing with the bevel gear 44 is a further bevel gear 78 which is rotatively mounted upon a bolt 76, FIG. 3, secured to the casing part 16 and fitted with an eccentric 77. Extending from the eccentric 77 is an eccentric rod 79 whose lower end is jointed to an arm 80, FIG. 6, of an oscillating crank 81 journalled in the casing part 15. Jointed to an arm 82 of the crank 81 is a further crank 83 in which is secured a pin 84 supporting a sliding block 85 movable upon said pin. The distance between the engaging point of the crank 83 and the pin 84 is equal to the distance between said point and the oscillating axis of the crank 81.

The sliding block 85 is displaceably mounted within the fork or guide of an adjusting or setting lever 87 which is secured to the section 88 of a control shaft 91 comprising separate sections 88, 89 and 90 and being journalled in the casing part 16. Sections 88, 89 of the shaft 91 are arranged in spaced and parallel relation to one another, each having secured thereto a lever 93 fitted with a ball-shaped end. The ends of the lever 93 are in turn jointed by an adjustable link 94 fitted with ballsockets. The shaft section 89, 90, FIGS. 6 and 7 are connected through an electromagnetic coupling 95 described in greater detail in the following.

Each of the adjusting levers 87 of the various sewing units has its own electromagnetic coupling 95, all said couplings being adjustably mounted upon a supporting bar or plate 97 secured to the walls 2 and 3 of the frame 1 and being provided with a longitudinal solt 96 for securing therein the mounting plates or lugs 99, 100 of the couplings 95 by means of screws 98. Secured to the luge 100, FIG. 7, is an iron core 101 carrying an exciting winding 102, said core having an annular groove 103 into which projects the annular extension 104 of a coupling disk 105 being secured to the shaft section 90 of the control shaft 91 which latter passes through bores in the lugs 99, 100 and the slot 96. The disk 105 is fitted with a filling 106 of friction material, to provide an effective friction coupling surface.

Mounted upon shaft section 89 of the control shaft 91 being supported by the frame 1, is a disk or sleeve 107 having external teeth which mesh with an internal ring gear 108 made of magnetic material and being axially displaceable upon the sleeve 107, such as to be attracted towards the coupling disk 105 by the magnetic field upon energization of the winding 102, whereby to couple both shaft sections 89 and 90 of the control shaft 91. Disposed upon the shaft section 89 is a cover 109 which serves to prevent penetration of dust and other foreign matter into the interior of the magnetic coupling.

Secured to the outer or opposite end of the shaft section 90 is a lever 110 which is jointed to a follower 112 secured to a control rod 111 which is parallel to the supporting plate 97. Rod 111 is rigidly connected through a cross arm 113, with a further rod 114 to which is secured a follower 115. Jointed to the follower 115 is the end of a lever 116 whose opposite end is secured to a bearing pin 117 of a scanning lever 118 rotatively mounted upon an angular support or bracket 125. Mounted upon a pin 119 of the lever 118 is a rotatable scanning roller 120 which cooperates with a control cam 123 carried by the program or control disk 121, FIG. 5, to be described presently, said cam advantageously consisting of a multiplicity of cam elements disposed within a sector-shaped groove of said disk and serving to effect the control of the shaft 91 and, in turn, of the setting lever 87. The control or program disk 121 is rotatively supported upon a shaft 124 secured to the bracket 125, FIG. 4, upon the frame 1.

Mounted upon the end of the bearing pin 84 projecting beyond the sliding block 85, FIG. 6, is the end of a pull bar 126 whose opposite end is jointed to one arm 127 of an angular oscillating lever 129 journalled about a stationary pivot pin or bolt 128. Secured to the remaining arm 130 of the lever 129, which extends to a point closely behind the needle 33, is an offset buttonhole cutting knife 131 secured by a screw 132. The afore-described linkage and control mechanism for the operation of the buttonhole knife 131 normally is urged to a starting or inoperative position by the action of a torsion spring 133 mounted upon the shaft section 88 and being secured to the casing part 16, on the one hand, and to the setting lever 87, on the other hand.

Secured to the lower end of the operating shaft 21, and projecting beyond the casing 15 are a pair of gears 135 and 136, FIG. 2. Meshing with the gear 135 is a countergear 137 which is secured to a loop taker shaft 140, FIGS. 8 and 8a, being journalled in a pair of supporting walls 138, 139 which form part of the lower section 17 of the housing 15. The transmission ratio between the gears 135 and 137 is 1:2, whereby to cause the loop taker shaft 140 to perform two revolutions during each revolution of the shaft 21, in a manner well known in connection with lockstitch sewing machines of the type shown by the drawing.

The loop taker shaft 140 has an eccentric extension 141, FIGS. 8 and 8a, supporting a clearing member 142. A sliding block 143 having a pin rotatively mounted in the wall 138 engages a fork 144 which extends from the member 142. Secured to the upper end of the loop taker shaft 140, by means of a screw 146 provided with an axial perforation, is a rotary loop taker 145 cooperating in a known manner with the needle to form lockstitches. Mounted within the loop taker 145 is a lower bobbin case 147 having an extension 148, FIG. 2, which cooperates with the member 142, to prevent the lower case 147 to rotate together with the loop taker 145 and to facilitate the thread passage by twisting the case 147 about the rotating loop taker. Mounted within the lower case 147 of the loop taker 145 is an upper case 150 supporting the bobbin 149 and having a central depending pin 151 formed with a slot which terminates in a cross bore 153. The free end of the pin 151 has a conical extension 154 engaging a corresponding conical bore 155 in the lower case 147. As a consequence, the pin 151 normally tending to spread outwardly is compressed by the bore 155 of the case 147, whereby to enable free rotation of the bobbin 149 and to clamp the same against said pin upon withdrawal of the upper case 150.

The loop taker shaft 140 has a longitudinal inner bore 156 formed in two steps, wherein is disposed an axially displaceable pin 157 which is encircled by a compression spring 158 having an end engaging a sprung ring 159 upon the pin 157 and having its opposite end engaging the shoulder of the bore 156. The lower end of the shaft 140 is closed by a perforated plug 160 passing the pin 157 which extends in a downward direction beyond the lower end of the loop taker shaft 140.

Ejection of the bobbins 149 together with the upper cases 150 effected by means of an operating shaft 162, FIG. 8, which is journalled in the side walls 2 and 3 and carries a number of levers 163, one for each sewing unit, cooperating with the respective ejecting pins 157.

Figure 11:
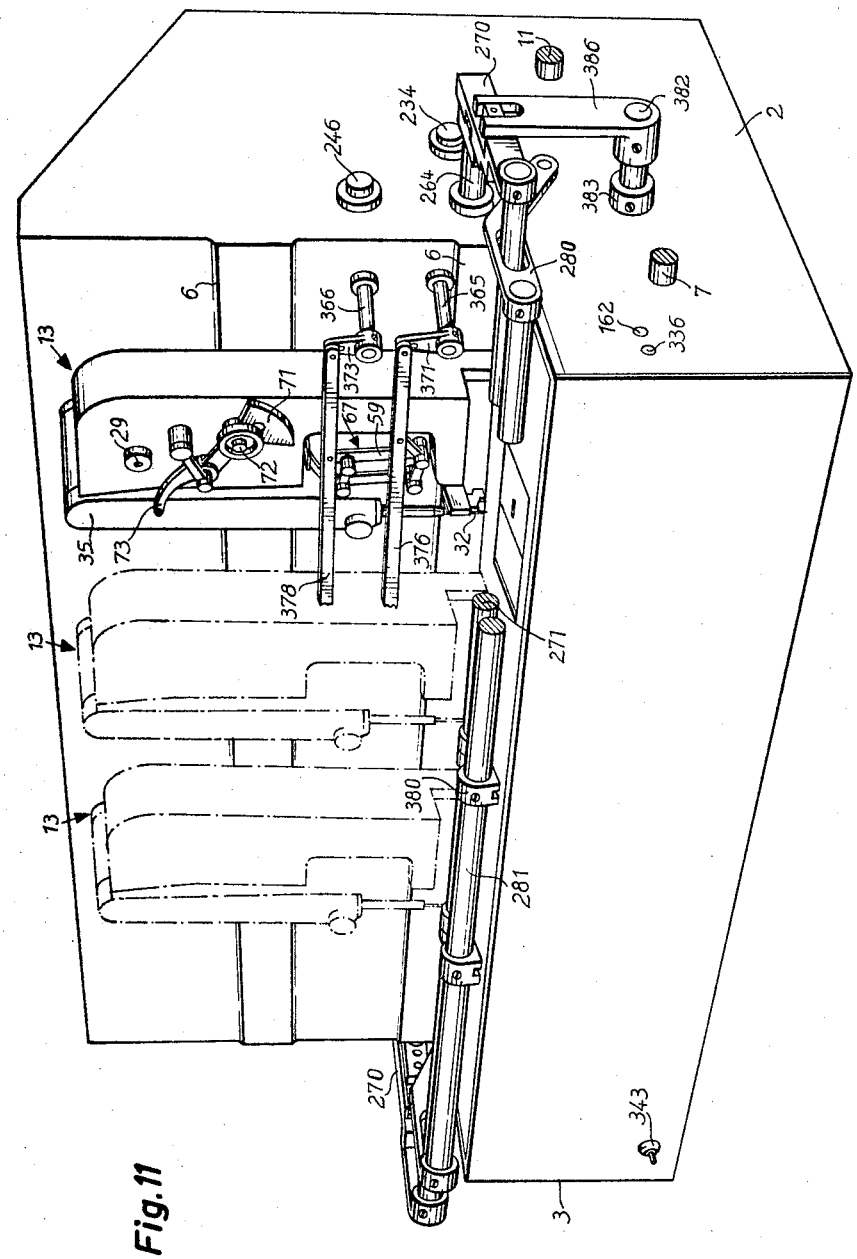
FIG. 11 is a view similar to FIG. 1 and showing the machine with the sewing heads transposed by an angle of 90° for the sewing of transverse buttonholes at right angle to the edge of the frame.

Mounted upon the offset portions of the side walls 2 and 3 and in front of the vertical wall or panel 5 of the frame 1, FIGS. 1 and 11, is a bed or fabric supporting plate 165 being fitted with an array of stitching plates 164 corresponding to the number of sewing units. Rotatively mounted about a pin 167, FIG. 8, within the bed 165 and above each loop taker 145, is a spring-loaded cover 166 which has an extension 168 supporting one end of a tension spring 169 whose opposite end is held in a boss 170 secured to the casing part 15.

The gear 136, FIG. 2, upon the vertical shaft 21 meshes with a gear 171 which is rotatively supported by a pin 172 mounted upon the supporting wall 139 and secured against axial displacement by an abutment disk (not shown) being in turn secured to the end of the pin 172 by means of a screw or the like securing means. Gear 171 meshes with a further gear 173 which is secured to a shaft 174 journalled in the supporting wall 139 and secured against axial displacement by a set ring 175. The axis of the shaft 174 is in line with the axis of the needle bar 33 in its "zero" position, that is, the position of zero oscillating amplitude of the lateral or zigzag needle oscillations.

Secured to the shaft 174 and below the gear 173 is a bevel gear 176 which meshes with a counter bevel gear 177 having an extension sleeve and being secured to the main drive shaft 7 of the sewing units 13. In order to ensure a correct angular position of the gear 177 during its axial adjustment upon the shaft 7, as is important for the maintenance of the correct adjustment of the loop taker beak relative to the needle 32, the shaft 7 is fitted with an adjusting spring 178 engaging a groove 179 in the gear 177.

Rotatively mounted upon the casing part 17, FIG. 8, at a position parallel to and spaced from the loop taker shaft 140, is a carrier 180 to which is secured a lower thread cutter 181 arranged to cooperate with a counter-knife edge 183 secured to the casing part 17. The counterknife 183 may be fitted in a known manner with a thread clamp which serves to hold the end of the lower or bobbin thread during the commencement of a sewing operation until the first stitch of a stitching group has been sewn. Secured to the opposite end of the carrier 180 is a set ring 184 which carries a lever arm 185 for the operation of the thread cutter. Lever 185 is formed at its free end with a fork 186 forming a connection for the application of the operating movement of the cutter 181, in a manner to be further described in the following.

Further rotatively mounted in the casing part 16 is a shaft 188 for the operation of a thread tension release, FIG. 9, being mounted upon the cover 187, said shaft having secured to it a crank 189, FIG. 2, and a lever arm 190. The crank 189 has an angular extension arm 191 which projects into a slot 192 in the housing part 16 limiting the rotation of the shaft 188. Arm 191 is actuated by the upper end of the extended connecting link 63, FIGS. 2 and 4.

The thread tension release comprises a bracket 193 secured to the cover 187 to which is hinged a pressure plate 195 which cooperates with an axially displaceable pin 194 of the thread tension, FIG. 9. Mounted in the pressure plate 195 is a screw 196 with a compression spring being disposed between the head of said screw and said plate, to prevent unauthorized loosening of the screw 196. The latter is urged against the lever 190 by the action of a spring 198 engaging the bracket 193, on the one hand, and engaging a lug 195a extending from the plate 195, on the other hand. The release pin 194 of the thread tension engages the tension disk 200 mounted upon the tension pin 199, whereby to release the disk 200 from the cooperating tension disk 202 upon rotation of the shaft 188 by the connecting link 63 against the action of the spring 202 disposed between the nut 201 upon the end of pin 199 and the disk 200, in a manner well understood.

In order to prevent, in the case of thread breakage in one of the sewing units, the cutting of the respective buttonhole, there is provided upon the carrier plate 187 of each unit a thread tension sensing or monitoring device 204, FIG. 9, which cooperates with a thread tension spring 205 in such a manner as to cause said spring in the case of a loose thread as a result of breakage or tearing, to engage a contact and to de-energize the associated magnetic coupling 95 of the respective buttonhole cutter 131, that is, by returning the latter to its inoperative or rest position by the action of the spring 133, FIG. 6.

In order to drive the control disk or program carrier 121, FIG. 4, rotatively mounted upon a shaft 124 secured in the support or bracket 125, the drive shaft 7, FIG. 1, carries a worm 206 which cooperates with a worm gear 207 secured to a shaft 209 which is journalled in the supporting wall or panel 5 and the bracket 125 and secured against axial displacement by a set ring 208, FIG. 4. Secured to the end of shaft 209 projecting from the bracket 125 is a gear 210 which meshes with a countergear 212 rotatively supported by a bolt to pin 211 being secured in the bracket 125. Further mounted upon the pin 211 is a spacing sleeve 213 and a gear 214. Gear 214 is removably connected with the gear 212 by means of coupling pins 215 or the like and, in turn, meshes with the peripheral gear teeth of the control or program disk 121 which serves to produce the control movements for the sewing of the multiple stitching patterns by the various sewing units 13, in the manner as will be further explained and described in the following.

FIG. 4 shows the control disk 121 as viewed from the front together with the control mechanisms for the transmission of the control movements (overstitch width and stitching position) produced during rotation of said disk to the connecting or coupling points 60 and 66, respectively, of the adjusting mechanism 67. For the latter purpose, the front surface of the disk 121 is provided with a plurality of cams or projections 216, 217, 218 and 219 which are in turn provided with fractional parts 220 for the adjustment of the length of the cams advantageously mounted in arc-shaped grooves 221 of the disk 121, to ensure accurate guidance and alignment of the cam surfaces. The cams 216–219 or portions 220 are furthermore advantageously provided with sloping ends, to facilitate the engagement with the cam followers described in the following.

Mounted in the bracket 125 in axially slidable manner are three push or scanning rods 222, 223, 224 each carrying a rotating scanning roller 225 at one end, roller 225 of rod 222 cooperating with the arcuate cam 216 and roller 225 of rod 223 cooperating with the diametrically disposed cams 217 and 218. Both push or scanning bars 222 and 223 engage, at their end opposite to the rollers 225, a lever 226 which is rotatively mounted upon a pin 227 journalled in the bracket 125. Lever 226 is provided with an adjusting screw 228 serving to axially displace the rod 223. Further secured to the lever 226 is a fork 229 to which is jointed the end of a connecting rod 230 whose opposite end is adjustably connected with an adjusting lever 232 having an arcuate slot 231 engaged by a setting screw 233. The adjusting lever 232 is in turn mounted upon the control shaft 234 which is journalled in the side walls 2 and 3 of the frame 1 and secured against axial displacement by a set ring 235, only one of such rings being shown in FIG. 1.

Associated with the setting mechanism 67 of each sewing unit 13 is an oscillating lever 236 being secured to the control shaft 234, each of the levers 236 being in turn jointed, through a pull rod 237, with the end 66 of the setting lever 65 of the respective adjusting mechanism 67. The afore-described linkage mechanism is maintained, by the action of a tension spring 238 secured at one end to the lever 232 and secured at its opposite end to the bracket 125, in a position, whereby the rollers 225 of the scanning rods 222, 223 resiliently engage the cams 216, 217 and 218, respectively, of the program disk 121.

The roller 225 of the scanning rod 224 cooperates with the cam 219. Jointed to the fork-shaped end of the rod 224 opposite to the roller 225 is the end of a connecting rod 239 whose opposite end forms an internally threaded bush 240 for the reception of a threaded rod 241 which terminates in a fork 242. The latter is in turn adjustably secured, by means of a set screw 243, to a setting lever 245 having an arcuate slot 244 engaged by said screw. Lever 245 is mounted upon a control shaft 246 also being journalled in the side walls 2 and 3 of the frame 1 and secured against axial displacement by a set ring 247, only one such ring being shown in FIG. 1. Further associated with the adusting mechanism 67 of each sewing unit 13 is an oscillating lever 248 adustably mounted upon the control shaft, each of the levers 248 of the sewing units being connected, through a pullrod 249, with the end 60 of the respective setting lever 59 of the adusting mechanism 67. The afore-described linkage mechanism is maintained, by means of a tension spring 250 having one end secured to the lever 245 and having its opposite end secured in the bracket 125, in a position to cause the roller 225 of the scanning rod to resiliently engage the cam 219 of the control disk 121.

Figure 5:
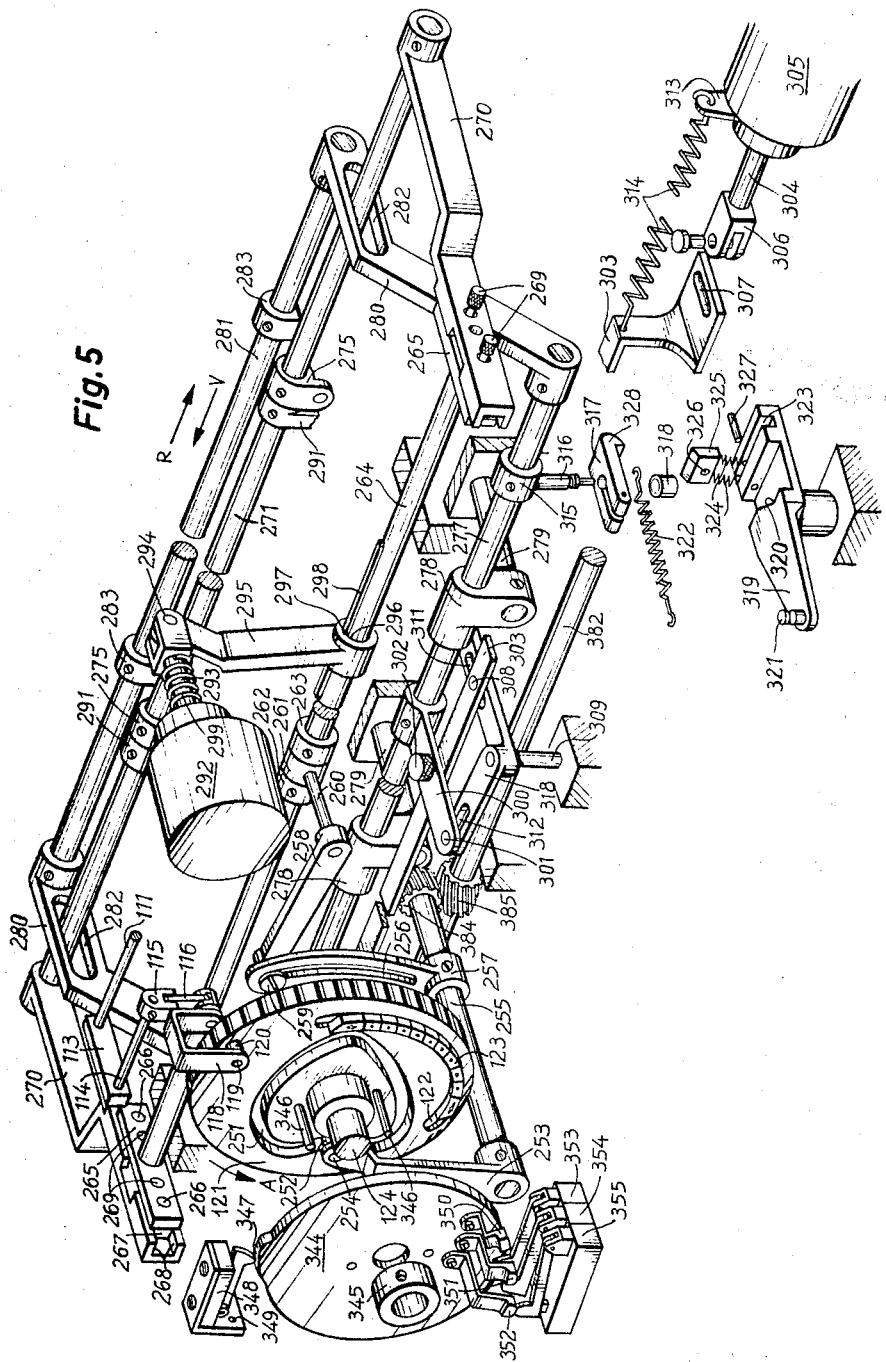
FIG. 5 is a schematic perspective representation, as viewed from the opposite side, of the program control device, and control mechanism for the work feeding frame and the upper thread cutters for the sewing of longitudinal buttonholes.

As shown more clearly by FIG. 5, the control disk 121 is furthermore provided with a curved groove 251 forming a cam into which projects a scanning roller 252 being rotatively mounted upon a pin 254 secured to the end of a control lever 253. The latter is in turn secured to a control shaft 255 which is journalled in the bracket 125 underneath the control disk 121 and to which is secured a setting lever 257 having an arcuate slot 256. Adjustably secured to the lever 257, by means of a screw 259 engaging said slot, is the end of a pull rod 258, whose opposite end is rotatively mounted upon a pin 260 of a follower lever 261 rotatively supported by a longitudinally displaceable slide shaft 264 between a pair of rings 262, 263 secured to said shaft. Secured to each end of the shaft 264 is a double-arm lever 265 upon the outer sides of which are provided, at equal distances from the shaft 264, a pair of sliding blocks 267 rotatively mounted upon pins secured to the levers 265, said blocks engaging slot guides 268 of a pair of supporting arms 270 secured to the levers 265 by means of set screws 269. The arms 270 are, in turn, secured to the ends of a supporting rod 271, FIG. 5, being parallel to the shaft 264 and forming together with the latter and the arms 270 the sliding frame supporting the work clamps 272, FIG. 10.

Figure 10:
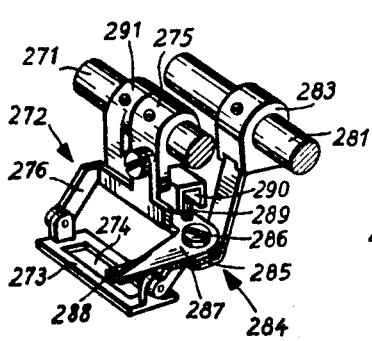
FIG. 10 is a perspective view of the work clamp and upper thread cutter in the position for the sewing of longitudinal buttonholes.

A separate work clamp 272, FIG. 10, is associated with each sewing unit or stitching mechanism and has a lower work engaging part 273 provided with a rectangular slot or opening 274 and being hinged to an upper part 276 mounted upon a carrier 275 which is secured ao the supporting rod 271.

Disposed parallel to the slide shaft 264 is a further slide shaft 277, FIGS. 5 and 13, rotatively and axially displaceably mounted in a pair of bearings 278. Each of the latter has a guide pin 279 at right angle to the shaft 277 and being each in turn axially displaceably mounted in a bore of the frame 1. In this manner, the shaft 277 is supported both rotatively and displaceable in two directions at right angle to one another. Shaft 277 is rigidly connected at both ends to the connecting arms 280 of a further supporting rod 281, each of the arms 280 being provided with a longitudinal slot 282 through which is passed the supporting rod 271. Associated with each sewing unit is an upper or needle thread cutter 284 supported by a carrier 283, FIGS. 5 and 10, which is secured to the supporting rod 281. The thread cutter 284 consists of a lower cutting part or element 285 and an upper cuting element 287 rotatable about a pivot screw 286, both said cutting elements being fitted with cutting edges 288. Secured to the upper cutter element 287 is a pin 289 which engages a slot 290 of a guide piece 291 supported by the rod 271, sufficient clearance being provided between the pin 289 and 290 slot.

In order to effect a simultaneous raising and lowering of the supporting rods 271, 281 in conjunction with the work clamps 272 and upper thread cutters 284, there is provided an electromagnet or solenoid 292, FIG. 5, mounted upon the bracket 125 and having a pull rod or plunger 293 terminating in a fork 294 which is jointed to one end of a lever 295. The remaining end of the lever 295 has a bore 296 being provided with a longitudinal groove 297 adapted for engagement by a key or adjusting spring 298 secured to the slide shaft 264, whereby to enable axial displacement of the shaft 264 within the bore 296. Mounted upon the pull rod 293 of the magnet 292 is a compression spring 299 normally urging the supporting levers 271, 281 to their lowered or operative position engaging the bed 165 or work being operated on.

Further secured to the slide shaft 277 are a pair of follower levers 300 each being provided with a pair of bores 301. Levers 300 are each jointed, by means of a pin 302, to an actuating bar 303 which is in turn jointed to the fork 306 of the pull rod 304 of a further electromagnet or solenoid 305 supported by the frame 1. Bar 303 has an extension in which is provided a longitudinal slot 307 and is fitted with a pair of depending pins 308. Rotatively supported by a pair of stationary bolts 309 are a pair of bellcrank or angular levers 310 each having one of its arms forming a fork 312. The pins 308 of the bar 303 engage the slots of the levers 310 which serve for the re-routing of the movements derived from the electromagnet 305 upon the slide shaft 277, upon changing from longitudinal to transverse button holes, and vice versa. A tension spring 314 having one end secured to an ear 313 of the magnet 305 and having its opposite end secured to the bar 303 serves to urge said bar to its inoperative or starting position.

Besides the bearings 278, the slide shaft 277 has secured to it two control levers 315 (only a single lever being shown in the drawing), the depending pins 316 of which, carrying a blocking member 317 secured by clamping, rotatively support a cam follower or roller 318. Further associated with each control lever 315 is a cam element 319 being adjustably mounted upon the frame 1 and having a cam surface 320 cooperating with the respective rollers 318, the latter being resiliently urged against said surface by the action of a tension spring 322 having one end secured to a pin 321 of said element and having its opposite end secured to the pin 316 of lever 315. As a consequence, axial displacement of the shaft 277 will result in a simultaneous parallel displacement of said shaft as determined by the cam surface 320 engaged by the roller 318.

Displaceably mounted within a groove 323 of the cam 319 is a locking plate 325 being subject to the action of a pair of compression springs 324 and having a sloping top surface. Plate 325 is secured in position by a pin 327 being in turn secured in the cam 319 and engaging a bore 326 of the plate 325. The latter cooperates with the member 328, to prevent unauthorized operation of the upper thread cutters 284.

In order to effect operation of the lower thread cutters 181, there is provided a further electromagnet 330, FIGS. 1 and 8, mounted upon a bracket 331 secured to the frame 1 in front of the supporting wall 5. Secured to the pull rod 332 of magnet 330 is a form 333 to which is jointed a lever 334, being pivotally mounted upon the bracket 331 and termintaing in a fork 335. Jointed to the latter is a follower member 337 secured to a control shaft 336 which is journalled in the side walls 2 and 3 of the frame 1, member 337 being in turn secured to it a tapped pin 338 which engages the slot 186 of the lever arm 185 described hereinbefore. A tension spring 339 secured in the bore 340 of a lug extending from the follower 337, on the one hand, and in a bore 341 of a lug 342 secured to magnet 330, on the other hand, serves to return the lower or bobbin thread cutter 181 to its starting position after actuation of the magnet 330.

A switch 343 mounted upon the frame 1, FIG. 1, serves to connect and start the motor 12. Rotatively mounted upon one end of the shaft 124 of control disk 121, FIG. 5, is a further control disk 344 which is secured against axial displacement by a set ring 345 and removably connected with the disk 121 by means of coupling pins 346, extending from disk 121 and engaging bores in the disk 344, or in any other suitable manner. Provided upon the circumference of the disk 344 is a cam or projection 347 which cooperates with a switch 348 for the control of the thread tension monitoring device 204, FIG. 9. More specifically, switch 348 is supported by a bracket 349 being secured to the side wall 3 and serves to interrupt the electrical circuit of the monitoring device 204 during the sewing of the locking stitches at the commencement of a button hole sewing operation, as will be further described in the following.

Adjustably secured to the outer face of the disk 344, one behind the other and in the direction of rotation of the disk as indicated by the arrow in the drawing, are three cams 350, 351 and 352 which cooperate, respectively, with further switches 353, 354 and 355 supported by a stationary bracket (not shown). More specifically, the switch 353 controlled by the cam 350 serves for the switching over of the motor 12 from a higher to a lower operating speed, the switch 354 controlled by the cam 351, cooperates in known manner with a position control device 356 mounted upon the drive shaft 7, FIG. 1, and including a cam 354 for the actuation of a switch 358 which serves to disconnect the motor 12, while the switch 355 controlled by the cam 352 serves to connect the electromagnets 305 and 330 controlling the upper and lower thread cutters, respectively.

Supported by a bracket 359, FIG. 1, secured to the frame 1 is a further switch 360 operated by a lever 334 at the end of the working stroke of magnet 330, to control the work lift magnet 292, FIG. 5, in the manner described in greater detail hereafter.

In the embodiment of the invention as shown by the drawings and described hereinbefore, the multiple sewing apparatus, comprising the units 13 and auxiliary operating mechanisms and devices, is designed or arranged for the sewing of longitudinal buttonholes, or buttonholes being parallel to the supporting surface of the units provided by the mounting ribs 6 of the supporting wall 5. In order to enable the sewing of buttonholes at an angle, in particular a right angle, to said surface, that is, to sew an array of transverse buttonholes, the housing parts 15 of the units 13 are provided with tapped holes 262. FIG. 1, for the mounting in the alternative position further means being provided for the conversion of the control and linkage mechanism, as described in the following.

Prior to the conversion of the sewing units 13 from the position for the sewing of longitudinal buttonholes, FIG. 1, to the position for the sewing of transverse buttonholes, FIG. 11, the connecting rods 237 and 249, FIGS. 1 and 4, are removed, the connecting rods 94, FIG. 6, are loosened from the levers 93 secured to shaft sections 88 and 89 of the control shaft 91, the set rings 184, FIG. 8, secured to the carrier 180 are loosened and the work supporting plate or table 165 is removed. The sewing units 13 are then removed from and re-mounted upon the supporting wall 5 after rotation by 90° in the manner shown in FIG. 11, with the mounting surfaces 20, FIG. 2, engaging the supporting surface of ribs 6, care being taken during this operation to maintain the same relative position between the gears 176, 179. For the latter purpose, the corresponding teeth of the gears may be suitably marked. As a consequence, the oscillating axes of the needle frames 35 will be at right angle to the supporting surface of the ribs 6, while the distance between the center of the needles and said surface remains the same.

The magnetic couplings 95 together with the shaft sections 89, 90, the levers 110 and followers 112 are then displaced laterally, whereby the ends of the sections 89 which are secured to levers 93 are inserted in corresponding bores 363 of the wall 5, FIG. 15. The levers 93 are then again connected with the connecting rods 94 in the manner shown in FIG. 15, whereby to re-route the oscillating movement imparted to the sections 89, 90 by the cam 123, FIG. 5, by an angle of 90° and to impart the same to the sections 88 and setting levers 87. The set ring 184 together with lever 185 are then rotated by 90° relative to the carriers 180 and secured in the rotated position. The supporting plate 165, after being fitted with stitching plates 364 corresponding to the changed position of the units 13 is then returned in place and secured in the frame 1.

Figure 12:
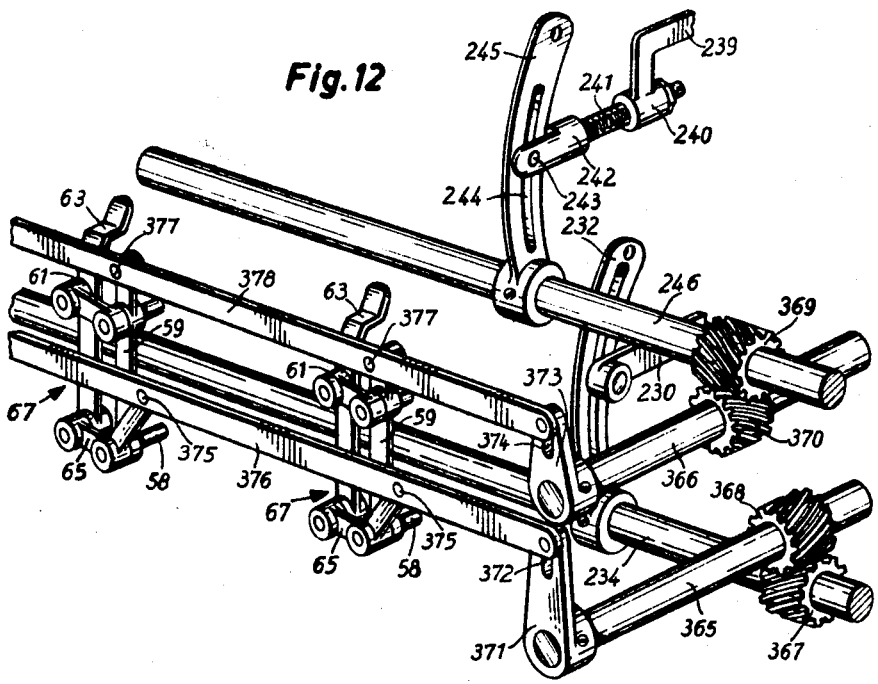
FIG. 12 is a perspective view of the linkage mechanism controlled by the program device for the control of the overstitch width and stitching position, as modified for the sewing of transverse buttonholes.

Provided for the operation of the adjusting mechanisms 67 of the units 13 in the converted position are a pair of oscillating shafts 365, 366, FIG. 12, disposed at right angle to the respective control shafts 234, 246 and being supported in the frame 1 in a position parallel to the base 4, shafts 365 and 366 being secured against axial displacement in any suitable manner (not shown). Control shaft 234 is connected with shaft 365 through a spiral gear pair 367, 368 and control shaft 246 is connected with shaft 366 through a spiral gear pair 369, 370. Secured to the front end of shaft 365 is an oscillating lever 371 having a slot 372 and secured to the front end of shaft 366 is an oscillating lever 373 having a slot 374. The setting levers 65 of the adjusting mechanisms 67 are jointed, by means of pins 375 engaging the bores 66, to a common control bar 376, and the setting levers 59 are jointed, by means of pins 377 engaging the bores 66, to a common control bar 378. Control bar 376 is in turn jointed to the oscillating lever 371 and control bar 378 is jointed to the oscillating lever 373. As a consequence, the movements imparted by the cams 216–219, FIG. 4, to the control shafts 234, 246 are re-routed by 90° to operate the setting levers 59 and 65 of the adjusting mechanism in the converted position of the sewing units 13.

Figure 14:
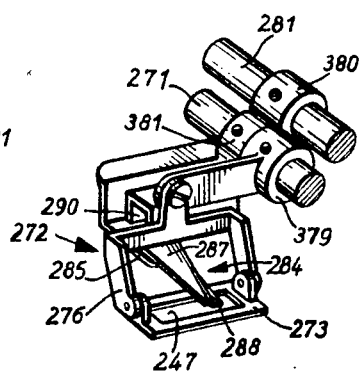
FIG. 14 is similar to FIG. 10, showing the change-over position of the work clamps and upper thread cutters for the sewing of transverse buttonholes.

The work clamps 272, upper thread cutters 284 and guide members 291 in the position for the sewing of transverse buttonholes are secured to carriers 379 and 380, respectively, and guide members 381, FIGS. 13 and 14, being adapted to the changed position of the sewing units and secured to the supporting rods 271, 281, respectively, in place of the carriers 275 and 283, FIG. 10.

The slide shafts 264, FIG. 13, is secured against axial displacement in the frame by means of set rings (not shown). The connecting rod 258, FIG. 5, is removed, screws 269 unscrewed from the cross-arms 265 and the supporting arms 270. In order to re-route the oscillating movement imparted by the control shaft 255 by the cam groove 251 and through lever 253, to the supporting rod 171 of the work clamps 272, there is provided an oscillating shaft 382, FIGS. 5 and 10, journalled in the walls 2 and 3 in a position parallel to the base 4, said shaft being in turn secured axially by set rings 383, only one of which is shown in the drawing. The oscillating shaft 382 is operably connected with the control shaft 255 through a spiral gear pair 384, 385. Secured to each of the projecting ends of the shaft 382, near the setting rings 383, is an oscillating lever 386, FIGS. 11 and 13, terminating in a fork 387 at its free end. Secured in each of the supporting arms 270 is a pin 388 upon which is rotatively mounted a sliding block 389 engaging the fork 387 of the lever 386.

Finally, the blocking members 317, being clamped upon the pins 316 of the control levers 315, FIG. 17, and the cams 319 are rotated by 90° and the pins 302 of the follower levers 300 interchanged, to cause the forks 312 to engage the bellcrank levers 310.

It the following there will at first be described the operation of the machine shown by the drawings for the sewing of a row of buttonholes on the workpiece in line with the mounting surface (6) of the sewing units 13, referred to as longitudinal buttonholes herein.

It is assumed that the electrical operating devices of the machine are connected to a suitable power source, such as an electrical distribution network, by way of a master control switch, that the adjusting devices 67 of the sewing units 13 are set to a position for straight stitching, or zero zigzag amplitude, that the needle bars 33 are in the "UP" positions, that the work clamps 272 and upper thread cutters 284 supported by the rods 271 and 281, respectively, and the threadcutters, each holding one of the upper threads, are in the raised position in respect to the bed 165 as a result of the energization of the electromagnet 292 and by way of the lever 295, shaft 264 and cross-arms 265, that, furthermore, the buttonhole knives 131 are in their inoperative or rest positions, FIGS. 2 and 6, and, finally, that the cam 347 of the control disc 344, FIG. 5, has actuated the switch 348, whereby to interrupt the circuits of the thread tension monitoring device 204, FIG. 9, and of the magnetic couplings 95, FIG. 6. Furthermore, magnets 305 controlling the upper thread cutters are disconnected by switch 355 actuated by cam 352, FIG. 5, and, similarly, magnets 330 controlling the lower thread cutters are equally assumed to be in de-energized condition. After proper insertion and positioning of a fabric or workpiece upon the bed 165, switch 343, FIG. 1, is operated, whereby to de-energize the magnet 292 and to start in known manner the drive motor 12, through a suitable time delay relay (not shown), after the work clamps 272, FIG. 10, supported by rods 271 engage the work and firmly press the same against the bed 165, FIG. 1, by the action of the spring 293, FIG. 5, which may be assisted by an additional spring, if desired. During the same operation, the upper thread cutters 284, FIG. 10, supported by the rod 281 are also lowered, whereby the rollers 318 upon the pins 316, FIG. 5, of the control levers 315 asume a position to engage the surface 320 of the cam 319 (only one cam 319 and control lever 315 being shown in the drawing). The motor 12 is started to revolve at a relatively high speed, whereby to rotate the common drive shaft 7 by way of the sprocket 10, chain 9 and sprocket 8, shaft 7 and to in turn drive, by way of the worm 206, worm gear 207, shaft 209 and gears 210, 212, 214, the control or program disk 121, on the one hand, and to drive, by way of bevel gears 177, 176 and gears 173, 171, 136 the vertical drive shafts 21 of the sewing units 13. Inasmuch as all sewing units are identical and controlled in synchronism, reference will be had in the following to a single unit 13 only.

The needle bar 33 carrying the needle 32 at its lower end is vertically reciprocated within the needle bar oscillating frame 35 through the action of disk 25, FIG. 2, link 27 engaging the slanting bore 26 of said disk, oscillating lever 29 and pull rod 31. The loop taker shaft 140 carrying the loop taker 145, FIGS. 2 and 8 and co-operating in known manner with the needle 32 in the formation of lockstitches, is driven by the gear 135 mounted upon the shaft 21 and meshing with gear 137 mounted upon the loop taker shaft 140, the loop taker rotating at twice the speed of the shaft 21 in a manner customary with lockstitch sewing machines of the type shown. During operation, the eccentric extension 141 of the loop taker shaft 140 imparts to the clearing member 142, which cooperates with the extension 148 of the lower loop taker case 147 and rotates about the pin of the sliding block 143 engaged by the fork 144, an elliptical movement, to facilitate the feeding of the lower or bobbin thread.

The bevel gear 68 mounted upon shaft 21 drives, by way of bevel gear 69 the shaft 70, FIG. 1, carrying crank 71 in which is secured the crank pin 72. Rotation of the latter causes a non-uniform oscillating movement of the thread-takeup lever 73 by way of link 74 supported by said pin and rotatably mounted upon the stationary bolt 75.

The bevel gear 52 drives the bevel gear 44 mounted upon the extension 45, FIGS. 3 and 4, of the stationary shaft 46 carrying the eccentric 43 which cooperates with the guide 42 of the guide lever 41 jointed to the needle bar oscillating frame 35. The adjusting guide 56 normally has an angular position, whereby the lever 41 oscillates about the pin 40 of the needle bar frame 35. In this position, the connecting link 63, FIGS. 2 and 4 holds the crank 189 upon shaft 188 in such a position as to release the thread tension, FIG. 9, by the action of lever 190 upon shaft 188 causing disengagement of the tension disk from the disk 203 through the plate 195 and release pin 194.

Bevel gear 44 provides the drive for the buttonhole knife 131. For this purpose, gear 44 meshes with the bevel gear 78 which is rotatively supported by the stationary bolt 76 and provided with the eccentric 77 FIGS. 3 and 6, which serves to impart, during rotation of the gear 78 and by way of lever arm 87, oscillating movement to the crank 81 mounted in the housing part 15, said movement being in turn transmitted by way of the lever arm 82 of crank 81, to the crank 83 which oscillates about pin 84 having its axis coincide, in the position of the adjusting lever 87 shown in the drawing, with the oscillating axis of the crank 81, whereby crank 83 performs a pure oscillating movement about the pin 84 without any motion being imparted to the lever 126.

At the commencement of a sewing cycle, a few locking stitches are sewn with the needle 32 in the zero position and with the upper thread tension being released, whereby the rollers 225 of the scanning bars 222, 223, FIG. 4, engage the plane surface of the control or program disk 121 driven in the direction of the arrow A. Upon completion of the locking stitches, cam 216 is engaged by the roller 225 of the scanning bar 222, whereby to displace said bar in an axial direction. The displacement of the bar 222 is imparted, by way of lever 226 and setting lever 232, to the control shaft 234 by which it is, in turn, transmitted to each of the adjusting mechanisms 67 of all the sewing units by way of the oscillating levers 236, pull rods 237 and adjusting levers 65. As a consequence, lever 65 rotates about the stationary bolt 58, whereby to cause, by way of connecting link 63 and link 61 secured to the pin 57 of the adjusting guide 56, an angular displacement of the latter from the normal position shown in the drawing, FIG. 4. Simultaneously the connecting link 63 releases the crank 189, FIG. 2, whereby the spring 198, FIG. 9, acts to disengage the pressure plate 195 from the release pin 194, to result in the clamping of the upper thread by the disks 200 and 203.

As a result of the angular displacement of the adjusting guide 56, lever 41, by the action of the sliding block 54 cooperating with the guide 55, performs aside from its oscillatory movement about the pin 40, a lateral translatory movement, in such a manner as to impart oscillatory movemetn to the needle bar frame 35 about its pivot pin or bolt 38. The oscillating amplitude of the frame 35 or needle 32 (overstitch width) is dependent upon the angular position or rotation of the adjusting guide 56, that is, in turn upon the angle of displacement of the common control shaft 234 of the sewing units. The displacement of shaft 234 may be controlled by the adjustment of the connecting rod 230 within the slot 231 of the setting lever 232.

After the sewing of the locking stitches has been completed, cam 347, FIG. 5, releases the switch 348, whereby to energize the control circuit of the thread tension monitoring device 204, FIG. 9, as well as of the magnetic couplings 95, FIGS. 6 and 7. As consequence, coupling ring 108 is attracted by the coupling disk 105, whereby sections 89 and 90 of the control shaft 91 are coupled with one another.

As soon as the cam 216 engages the scanning lever 222 to result in the adjustment of the overstitch width of the needle bar 33 in the manner described, the displacement or feeding operation of the work clamps 272 supported by the rod 271, FIG. 10 is initiated. The work feeding movement is derived from the cam groove 251 of disk 121, FIG. 5, by way of the scanning roller 252 supported by control lever 253, the latter being deflected in accordance with the shape or configuration of the groove 251. The deflecting movement of the lever 253 is transmitted, by way of lever 257 secured to control shaft 255, pull rod 258 and follower 261, to the shaft 264 which, as a result, is displaced, together with the cross-arms 265, supporting arms 270, supporting rod 271 carrying the work clamps 272 and guide pieces 275, axially in the direction of the arrow V for the sewing of the first row of zigzag side stitches of the buttonhole.

The magnet 305 remains de-energized until the cam 352 releases the switch 355 at the end of the sewing of the first row of buttonhole stitches. As a consequence, magnet 305 is energized, whereby its pull rod 304 displaces, by way of actuating rod 303 and follower 300, the slide shaft 277, together with the control levers 315, the supporting arms 280 and the supporting rod 281 of the upper thread cutters 284, in the direction of the arrow V, during which operation the bellcrank levers 310 oscillate freely. During this axial movement, the slide shaft 277, together with the levers 315, rods 280 and 281 and thread cutters 284, is additionally displaced in the transverse direction by the action of the cam surface 320, roller 318 and spring 322, whereby to open the upper thread cutters by the pins 289 engaging the guides 290. Shaft 277 is locked at the end of its displacement, determined by the slope of the cam surface 320, by the locking plate 325 being engaged by the teeth 328, whereby to prevent any premature operation of the thread cutters 284.

The first row of buttonhole stitches is completed after a 180° rotation of the control disk 121. During the following 180° rotation of the disk, shaft 264 connected with the supporting rod 271 and work clamps 272 is displaced in the opposite direction, as shown by the arrow R in the drawing, as a result of the configuration of the control groove 251.

Immediately prior to the change of direction of shaft 264, cam 217, FIG. 4, actuates the scanning bar 223 by way of its roller 225, said bar imparting, by way of lever 226, connecting rod 230, setting lever 232, control shaft 234, oscillating lever 236 and pull rod 237, rotational movement about bolt 58 to the setting lever 65 of the adjusting mechanisms 67 of all the sewing units, which rotation is in turn transmitted, by way of the connecting link 63 and link 61 and pin 53 to the adjusting guide 56, to adjust the mechanism 67 for an increased overstitch width of the needle bar 33, for the sewing of the first barring stitches of the buttonhole pattern.

Simultaneously with the scanning bar 223 controlled by the cam 217, the scanning bar 224 is displaced axially by the cam 219. The latter displacement in turn causes, by way of the connecting rod 239 and setting lever 245, a partial rotation of the control shaft 246 adjusted by the setting of the screw 243 within the slot 244 of the setting lever 245. The rotational displacement of shaft 246 is transmitted, by way of the cranks 248 and pull rods 249, upon the setting lever 59 of the adjusting mechanism 67 of each sewing unit being rotatable about the stationary bolt 58. As a consequence (the adjusting guide 56 is displaced laterally, to adjust the mean stitching position of the needle bar 33 and to enable the sewing of the second row of buttonhole stitches.

At the beginning of the feed movment of the work clamps 272 in the direction of the arrow R, the first barring stitches are sewn determined by the length of the control cam 217.

As soon as the cam 217 releases the scanning bar 223, the scanning bar 222 is again caused to engage the cam 216 by the action of spring 238, whereby the adjusting guide 56 is operated to an angular position determined by the cam 216 and corresponding to an overstitch width for the sewing of the second row of buttonhole stitches, the position of the latter in relation to the first row of buttonhole stitches being controlled by the cam 219.

After the second row of buttonhole stitches having a length equal to the sum of the length of the first barring stitches and the length of the buttonhole knife 131, FIGS. 2 and 6, has been sewn (the buttonhole knife is disposed closely behind and spaced from the needle 32 by the distance equal to the length of the barring stitches), the cam 123 of the control disk 121, FIG. 5, acts to impart to the scanning lever 118, having a roller 220 and a lever 116 secured to the supporting pin of lever 118, a rotation which is transmitted to the control rod 111 and followers 112 by way of the followers 115, rod 114 and cross arm 113, and from there to section 90 of the control shaft 91 by way of the follower 112 and lever 110. Each sewing unit 13 is provided with its own control shaft 91 in the manner described hereinbefore.

The control shafts 91 are actuated by the common control rod 111. In the following, reference will be had to one of the shafts 91 only and to the couplings 95 connecting the sections 89 and 90.

As pointed out, the magnetic coupling 95 is energized during the buttonhole sewing operation, that is, shaft sections 89 and 90 are coupled with one another and controlled in unison. The movements imparted to sections 89 and 90 are in turn transmitted, by way of levers 93, pull rods 94 and sections 88, to the setting levers 87 which control the oscillating levers 129 supporting the buttonhole knives 131, to rotate said knives to their operative positions by the action of the sliding blocks 85 engaging the guide 86, crank 83 jointed to the pin 84 of the lever arm 82 of crank 81, and pull rod 126.

As a result of the rotation of the crank 83, the longitudinal axis of the pin 84 is displaced parallel to the oscillating axis of the crank 81 actuated by the eccentric 77 through the eccentric rod 79. As a consequence, the crank 83, aside from its rotational movement about the pin 84, is subjected to an additional oscillating motion which is transmitted to the lever 129 by way of pull rod 126, in such a manner as to reciprocate the buttonhole cutting knife 131 in a vertical direction.

In the event of tearing or breakage of the upper thread, the thread tension spring 205, FIG. 9, engages the contact of the thread tension monitoring device 204, whereby to de-energize the magnetic coupling 95 of the respective sewing unit 13 and to disengage the sections 89 and 90 of the associated control shaft 91. As a consequence, the buttonhole cutting knife of the respective unit will be returned to its inoperative position by the spring 133, while the knives of the remaining units continue to operate in the normal manner.

As soon as the cam 118 is engaged by the roller 225 of the scanning bar 223, which serves to effect the angular displacement of the adjusting guide 56 by way of the linkage mechanism 226, 230, 232, 234, 236, 237, 65, 63, 61 described previously, for the adjustment of the overstitch width of the needle bar 33 and sewing of the second row of buttonhole stitches, cam 350, FIG. 5, operates the switch 353, whereby to reduce the motor speed during the sewing of the second barring stitches.

After the second barring stitches have been sewn, the cams 216, 218, 219 release the scanning bars 222, 223, 224, whereby to return the adjusting guide 56 to its starting position by the action of the springs 238 and 250 and through the linkage mechanism described hereinbefore. At the same time cam 123 releases the scanning bar 118 and roller 120, whereby the buttonhole knives, together with their operating elements and the control shaft 91 are returned to their rest positions by the action of the tension springs 133.

During the stopping operation, cam 352 operates the switch 355, whereby to energize a time delay relay (not shown) which responds only after final stoppage of the machine and initiates the sequential de-energization of the magnet 365 and energization of the magnet 330, respectively. As a consequence, the slide shaft 277 together with the supporting arms 271 and 281 and the upper thread cutters is displaced, by the action of spring 314 and by way of the actuating rod 303 and follower levers 300, in the direction of the arrow R, whereby the teeth 328 glide along the locking plate 325. As a consequence, the upper thread cutters are held back until the teeth 328 have cleared the plate 325 and the slide shaft 277, together with the supporting arms 280 the supporting arm 281 and upper thread cutter are displaced, by the action of the spring 322, in a direction at right angle to the arrow R and towards the needles 32. The upper thread cutter being in the open position seizes the upper thread between the fabric and the eye of the needle and is closed by the pin 289 cooperating with the guide 290 during its advance movement, whereby to clamp the cut upper thread between the upper element 287 and the lower element 288 of the cutters 284 and to sever the thread by the edges 288.

Immediately thereafter, the magnet 330 displaces, by way of pull rod 332 and fork 333, the lever 334 and the followers 337, the control shaft 336 which in turn rotates the lower thread cutters 181 by way of the screw 338, lever 185 secured to the setting ring 184 and carrier 181. During this operation, the cutter 181 seizes and cuts the lower or bobbin thread in cooperation with the cutter element 183. The end of the lower thread leading to the bobbin 149 may be locked by a thread clamp (not shown) in a manner well known.

At the end of the buttonhole sewing cycle, magnet 330 acts to operate the switch 360, FIG. 1, by way of lever 334, whereby the lift magnet 292 is energized briefly, to effect raising or retraction of the work clamps 272 from the work, together with the thread cutters 284 supported by the rod 281, by way of the pull rod 293, lever 295, slide shaft 264, cross-arms 265 and supporting arms 270.

This completes the operating cycle or sewing of the longitudinal buttonholes in the example illustrated. After the removal of the workpiece and insertion of a new workpiece, the machine is ready for a new buttonhole sewing cycle.

After the lower thread bobbins or spools 149, FIG. 8, containing a predetermined length of thread have been exhausted and must be replaced by full and replenished spools, the upper cases 150 together with the empty spools 149 of all the sewing units are ejected by the operation of the shaft 162 by the aid of the handle bar or lever 161, and through the levers 163 cooperating with the ejecting pins 157 mounted in the hollow looper shafts 140, whereby to open at the same time the spring-loaded covers 166. During this operation, the spools 149 are retained by spring action upon the slitted pins 151 of the upper looper cases 150. After the mounting of replenished spools upon the pins 151 of each of the upper cases 150, the latter are reinserted in the lower cases 147 and the covers 166 returned to closed position.

The operation of the machine in the converted position, FIG. 11, for the sewing of transverse buttonholes is substantially the same as in the position for the sewing of longitudinal buttonholes, FIG. 1, the only difference being the presence of the conversion linkages to re-route the control movement derived from the program disk 121 and transmitted to the adjusting mechanisms 67 of each of the sewing units 13, on the one hand, and to the work clamps 272 and upper thread cutters 284, on the other hand. Accordingly, only the function of the conversion linkages will be described in greater detail in the following.

The movement imparted by the cams 216–218, FIG. 4, to the control shaft 234 is transmitted, by way of the spiral gears 267, 268, FIG. 12, to the cross-arms 365 and from there, by way of lever 371 and common control bar 376, to the individual setting levers 65 of the adjusting mechanisms 67, and, in turn, by way of the connecting links 63, FIG. 4, and link 61 to the adjusting guides 56 for the control of the overstitch width of the needle bar 33.

Similarly, the movement imparted by the cam 219, FIG. 4, to the control shaft 246 is transmitted, by way of the spiral gears 369, 370, FIG. 12, to the cross-shaft 366 and from there, by way of lever 372 and the common control shaft 366 to the individual setting levers 59 of the adjusting mechanisms 67 for the variation of the position of the adjusting guides 56, to control the stitching of the needle bar 33.

The conversion linkage for the work clamps 272 in the displaced position together with the displaced upper thread cutters 284 is shown more clearly in FIG. 13.

The movement imparted by the cam groove 251, FIG. 5, to the control shaft 255 by way of control lever 253 is in turn transmitted, by way of the spiral gears 384, 385, to the oscillating shaft 382 and from there, by way of the oscillating lever 386, slide blocks 389 and pins 388, to the supporting arms 270 and, in turn, to the supporting rods 281 connected with said arms and carrying the work clamps 272 and guiding members 381. The supporting arms 270 are fitted with guides 268 which are engaged by the blocks 267 supported by the cross-levers 265. As a consequence, the arms 270 together with the supporting rod 271 are displaced in a direction at right angle to the slide shaft 264 for the sewing of transverse buttonholes in cooperation with the oscillating needle 32.

In order to open the converted upper thread cutters 284, FIG. 14, the translatory movement imparted by the magnet 305, FIG. 5, to the actuating bar 303 is re-routed, by means of the bellcrank lever 310, FIG. 13, by 90° and transmitted to the slide shaft 277 by way of the follower lever 300, whereby shaft 277 is displaced at right angle to the shaft 264.

It is seen for the foregoing that the multiple group-stitch sewing machine according to the invention may be utilized for the sewing of either longitudinal or transverse buttonholes. Alternatively, it is possible by means of the same machine to so arrange the individual units 13 as to enable the sewing of both longitudinal and transverse buttonholes upon the same workpiece.

In the foregoing the invention has been described in reference to a specific illustrative device or machine. It will be evident, however, that variations and modifications, as well as the substitution of equivalent parts or elements for those shown herein for illustration, may be made without departing from the broader scope and spirit of the invention as set forth in the appended claims.

As an example, the mechanical control or program device, shown in the form of a cam disk and follower mechanism, may be replaced by any equivalent motion or data storage and pickup device known in the art, either mechanical or of other design, and adapted to produce the respective control movements for the overstitch width, stitching position, and work displacement, respectively, in accordance with the basic concept of the invention.

The specification and drawings are accordingly to be regarded in an illustrative rather than in a restrictive sense.

We claim:

1. Multiple-pattern sewing apparatus comprising in combination:
   (a) a common work supporting bed,
   (b) an array of zigzag sewing units in operative relation to said bed each including stitch-forming tools and first and second adjusting means therefor, to vary the overstitch width and stitching position, respectively,
   (c) common drive means for said sewing units including means for starting and stopping said units in unison,
   (d) a common work-displacing carrier and a plurality of work clamps supported thereby each for cooperation with one of said units,
   (e) a common stitching pattern control device including data storage and pickup means cooperating therewith,
   (f) means to operate said device in synchronism with said units, to produce control movements for said first and second adjusting means and operating movement for said carrier, respectively, in accordance with the configuration of the multiple stitching patterns to be produced by said units upon the work supported between said bed by said clamps, and
   (g) motion-transmitting means operably connecting said pickup means with the coordinated adjusting means of said units and with said carrier, respectively.

2. In multiple-pattern sewing apparatus as claimed in claim 1, including lower and upper thread cutters of said units, first and second common control means therefor, to simultaneously operate the cutters of all said units, and means synchronized with said control device, to operate said control means and to cut the threads at the end of a stitching pattern sewing cycle.

3. In multiple-pattern sewing apparatus as claimed in claim 1, including a common support for said units, means to adjust said units in different angular positions relative to said support, and conversion means to re-route the movements of said transmitting means derived from said control device and imparted to said adjusting means and said carrier, respectively, and to re-orient the displacement of said carrier, to enable the sewing of patterns of different angular orientation in respect to the work being operated on.

4. In multiple-pattern sewing apparatus as claimed in claim 1 as adapted for the sewing of an array of buttonholes comprised of a pair of adjacent button hole side stitches and barring stitches at the opposite ends of said side stitches, buttonhole cutting knives operably associated with each of said units and normally maintained in an inoperative position, and a plurality of operating means synchronized with said control device, to operate said knives to operative position upon the completion of a buttonhole sewing cycle, to simultaneously cut the buttonholes sewn by said units.

5. In multiple sewing apparatus as claimed in claim 4, each of said operating means including an electromagnetic coupling energized during the operation of said units, and a thread tension monitoring device for each of said units having an interrupting contact inserted in the energizing circuit of said couplings, to disengage the respective coupling of a unit subject to thread breakage during operation.

6. Multiple-pattern sewing apparatus comprising in combination:
   (a) a common work-supporting bed,
   (b) an array of zigzag sewing units in operative relation to said bed each including stitch-forming tools and first and second adjusting means therefor, to vary the overstitch width and stitching position, respectively,
   (c) common drive means for said units including means for starting and stopping the units in unison,
   (d) a common work-displacing carrier and a plurality of work clamps supported thereby each for cooperation with one of said units,
   (e) a stitching pattern control device having a plurality of control cams and cam follower means cooperating therewith, (f) means to operate said device in synchronism with said units, to produce control movements for said first and second adjusting means and operating movement for said carrier, respectively, in accordance with the configuration of the stitching patterns to be produced by each of said units upon the work supported between said bed and said clamps, and (g) motion-transmitting means operably connecting said cam follower means with the coordinated adjusting means of said units and said carrier, respectively.

7. Multiple-pattern sewing apparatus comprising in combination:

(a) a common work-supporting bed, (b) an array of zigzag sewing units in operative relation to said bed each including stitch-forming tools and first and second adjusting means therefor, to vary the overstitch width and stitching position, respectively, (c) a pair of oscillating control shafts parallel to one another and disposed in the direction of the axis of said array, (d) linkage means operably connecting each of said shafts with the respective first and second adjusting means of all said units, (e) common drive means for said units including means for starting and stopping the units in unison, (f) a common-work-displacing carrier and a plurality of spaced work clamps supported thereby each for cooperation with one of said units, (g) a stitching pattern control device having a plurality of control cams and cam follower means cooperating therewith, (h) means to operate said device in synchronism with said units, to produce control movements for said first and second adjusting means and operating movement for said carrier, respectively, in accordance with the configuration of the stitching pattern to be produced by each of said units upon the work supported between said bed and clamps, and (i) motion-transmitting means operably connecting said cam follower means with the coordinated control shafts of said units and with said carrier, respectively.

8. Multiple buttonhole sewing apparatus comprising in combination:

(a) a support, (b) a work-supporting bed mounted upon said support, (c) an array of zigzag sewing units mounted upon said support including stitch-forming tools and first and second adjusting means, to vary the overstitch width and stitching position, respectively, (d) a pair of oscillating control shafts parallel to one another and disposed in the direction of the axis of said array, (e) linkage means operably connecting each of said shafts with all the respective first and second adjusting means of all said units, (f) common drive means for said sewing units including means for starting and stopping the units in unison, (g) a common work-displaying frame and a plurality of work clamps supported thereby each for cooperation with one of said units, (h) a buttonhole pattern control device having a plurality of control cams and cam follower means co-operating therewith, (i) means to operate said device in synchronism with said units, to produce control movements for said first and second adjusting means and to produce operating movement for said frame, respectively, and (j) motion-transmitting means operably connecting said follower means with the coordinated control shaft of said units and with said frame, respectively, (k) said cams designed and spaced from each other, to cause the control movements derived therefrom by the associated follower means to control the overstitch width and stitching positions of said units and to successively displace said frame in opposite directions, to thereby sew an array of buttonholes comprising side and barring stitches upon the work supported between said bed and clamps.

9. In multiple buttonhole sewing apparatus as claimed in claim 8, including buttonhole cutting knives operably associated with each of said sewing units and normally maintained in an inoperative position, and a plurality of operating means synchronized with said control device, to operate said knives to their operative positions, to simultaneously cut the buttonholes sewn by said units.

10. In multiple buttonhole sewing apparatus as claimed in claim 9, each of said operating means including an electromagnetic coupling energized during the operation of said units, and a thread tension monitoring device associated with each of said units and having an interrupting contact inserted in the energizing circuit of said couplings, to disengage the respective coupling and disable the cutting knife of a unit subject to thread breakage during operation.

11. In multiple buttonhole sewing apparatus as claimed in claim 8, including means to mount said units upon said support in different operating positions at right angle to one another, and conversion means to re-route the movements of said transmitting means derived from said control device and imparted to said adjusting means and said frame, respectively, and to reorient the displacement of said frame, upon change from one to the other operating position, whereby to enable the sewing of either longitudinal or transverse buttonholes, respectively, by said units in respect to the edge of the work being operated on.

12. In multiple buttonhole sewing apparatus as claimed in claim 8, including upper and lower thread cutters of said units, first and second control means therefor, to simultaneously operate the cutters of all said units, and means synchronized with said control device to operate said control means and cut the threads at the end of a buttonhole sewing cycle.

References Cited by the Examiner

UNITED STATES PATENTS

| | | | |
|---|---|---|---|
| 1,197,400 | 9/1916 | Richter | 112—103 |
| 1,537,155 | 5/1925 | Allen | 112—76 |
| 2,896,562 | 7/1959 | Scheibel et al. | 112—103 |
| 2,985,123 | 5/1961 | Jullie | 112—67 |
| 3,068,816 | 12/1962 | McBean et al. | 112—2 X |
| 3,224,396 | 12/1965 | Dobner et al. | 112—2 X |

JORDAN FRANKLIN, *Primary Examiner.*

J. R. BOLER, *Assistant Examiner.*